TWO-OUT-OF-FIVE CODED DECIMAL COUNTER

Filed April 13, 1967 2 Sheets-Sheet 1

INVENTOR
D. J. MORGAN
BY
Charles Scott Phelan
ATTORNEY

FIG. 2

| DECIMAL DIGIT | COUNTER STATE 0 A | 1 B | 2 C | 4 D | 7 E |
|---|---|---|---|---|---|
| 0 | 0 | 0 | 0 | 1 | 1 |
| | 0 | 1 | 0 | 1 | 1 |
| | 1 | 1 | 0 | 1 | 1 |
| | 1 | 1 | 0 | 0 | 1 |
| 1 | 1 | 1 | 0 | 0 | 0 |
| | 1 | 0 | 0 | 0 | 0 |
| 2 | 1 | 0 | 1 | 0 | 0 |
| | 1 | 1 | 1 | 0 | 0 |
| 3 | 0 | 1 | 1 | 0 | 0 |
| | 0 | 0 | 1 | 0 | 0 |
| | 0 | 0 | 0 | 0 | 0 |
| | 1 | 0 | 0 | 0 | 0 |
| 4 | 1 | 0 | 0 | 1 | 0 |
| | 1 | 1 | 0 | 1 | 0 |
| 5 | 0 | 1 | 0 | 1 | 0 |
| | 0 | 0 | 0 | 1 | 0 |
| 6 | 0 | 0 | 1 | 1 | 0 |
| | 0 | 1 | 1 | 1 | 0 |
| | 1 | 1 | 1 | 1 | 0 |
| | 1 | 1 | 1 | 0 | 0 |
| | 1 | 1 | 1 | 0 | 1 |
| | 1 | 0 | 1 | 0 | 1 |
| 7 | 1 | 0 | 0 | 0 | 1 |
| | 1 | 1 | 0 | 0 | 1 |
| 8 | 0 | 1 | 0 | 0 | 1 |
| | 0 | 0 | 0 | 0 | 1 |
| 9 | 0 | 0 | 1 | 0 | 1 |
| | 0 | 1 | 1 | 0 | 1 |
| | 1 | 1 | 1 | 0 | 1 |
| | 1 | 1 | 1 | 1 | 1 |
| | 1 | 0 | 1 | 1 | 1 |
| | 1 | 0 | 0 | 1 | 1 |
| 0 | 0 | 0 | 0 | 1 | 1 |

United States Patent Office

3,532,860

Patented Oct. 6, 1970

3,532,860

TWO-OUT-OF-FIVE CODED DECIMAL COUNTER

Dennis J. Morgan, Westerville, Ohio, assignor to Bell Telephone Laboratories, Incorporated, Murray Hill and Berkeley Heights, N.J., a corporation of New York

Filed Apr. 13, 1967, Ser. No. 630,658
Int. Cl. H03k *23/24;* G06f *5/00*
U.S. Cl. 235—92 8 Claims

ABSTRACT OF THE DISCLOSURE

A feedback counter is developed from five flip-flop circuits interconnected by way of trigger and feedback paths such that the counter sequentially steps through states representing demical integers in a two-out-of-five code in response to input pulses.

The invention is a counter circuit that is more particularly described as a ripple type two-out-of-five coded decimal counter.

Ripple type binary-coded-decimal counters are well known in the prior art. A typical ripple type binary-coded-decimal counter uses a tandem sequence of bistable cells which are arranged to increment a step at a time in response to a series of input pulses. The cells are coupled together such that each successive cell in the sequence changes state in response to every second state change of a preceding adjacent cell. Feedback paths are interposed in the tandem sequence to recycle the counter in response to an additional input pulse after the counter reaches its ninth counter state. Thus, a binary-coded-decimal counter is arranged to step through nine distinct counter states in response to a series of nine input pulses and to recycle into an initial state in response to a tenth pulse.

Some computing systems process information in special error detecting codes to facilitate the detection of errors arising during computer operation. One such error detecting code is the two-out-of-five decimal code in which each decimal is assigned a different combination of two elements selected out of five elements as shown in the following table:

TABLE I

| | Two-out-of-five code | | | | |
|---|---|---|---|---|---|
| Decimal digit | 0 | 1 | 2 | 4 | 7 |
| 0 | 0 | 0 | 0 | 1 | 1 |
| 1 | 1 | 1 | 0 | 0 | 0 |
| 2 | 1 | 0 | 1 | 0 | 0 |
| 3 | 0 | 1 | 1 | 0 | 0 |
| 4 | 1 | 0 | 0 | 1 | 0 |
| 5 | 0 | 1 | 0 | 1 | 0 |
| 6 | 0 | 0 | 1 | 1 | 0 |
| 7 | 1 | 0 | 0 | 0 | 1 |
| 8 | 0 | 1 | 0 | 0 | 1 |
| 9 | 0 | 0 | 1 | 0 | 1 |

Counting functions in such a computer using the two-out-of-five code may be accomplished advantageously by means of a counter that steps through the two-out-of-five code. Since the two-out-of-five code does not increment in a uniform manner like counting in binary numbers, binary cells cannot be arranged in a straightforward ripple type of tandem sequence like those used for counting in binary codes.

SUMMARY OF THE INVENTION

An object of the invention is to arrange a counter for counting in the two-out-of-five code.

This and other objects of the invention are realized in an illustrative embodiment thereof in which five bistable cells are arranged to step through a decimal count in the two-out-of-five code in response to a series of ten input pulses. The counter includes feedback paths and a gate circuit which together control a sequence of stable and unstable counter states that the counter steps through in representation of decimal digits. The counter steps from one two-out-of-five coded decimal digit to the next higher coded decimal digit in response to each input pulse and recycles in response to the tenth pulse of a series.

A feature of this invention is a group of trigger and feedback paths intercoupling five bistable cells so that the cells step through states representing decimal digits in the two-out-of-five code in response to successive input pulses.

BRIEF DESCRIPTION OF THE DRAWINGS

A better understanding of the invention may be derived from the detailed description following if that description is considered with respect to the attached drawings in which:

FIG. 2 is a counter state sequence chart for the counter of FIG. 1.

DETAILED DESCRIPTION

Figure 1:
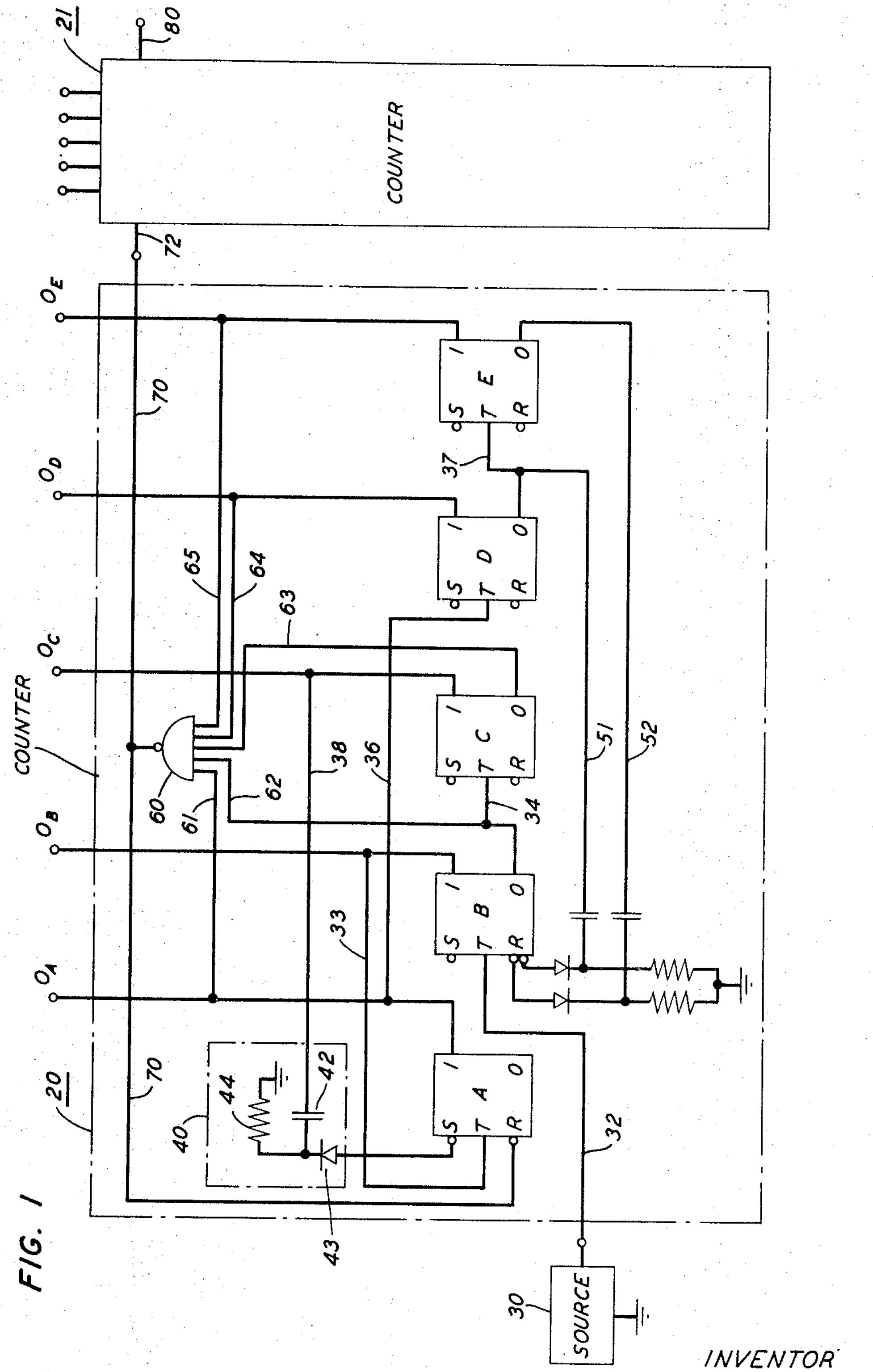
FIG. 1 is a schematic diagram of a two-out-of-five coded counter in accordance with the invention.

Referring now to FIG.1 there are shown two decimal counters 20 and 21 arranged in a tandem sequence. The counter 21 is a duplicate of the counter 20 so that only the counter 20 is shown in detail. The counter 20 is a five-cell cyclical counter which is arranged to count decimal digits represented in the two-out-of-five code by the states of the cells. Cells A, B, C, D, and E are bistable cells which are shown illustratively as R-S-T (reset, set, trigger) flip-flop circuits each of which is toggled, or complemented, in response to a positive-going signal transition applied to its trigger lead T.

The state of cells A, B, C, D, and E is indicated at their respective "1" and "0" outputs. Each cell indicates its "1" state by a ground potential on its "1" output and a negative potential with respect to ground on its "0" output. Conversely, each cell indicates its "0" state by a ground potential on its "0" output and a negative potential with respect to ground on its "1" output.

The cell A is the only cell requiring both a set input S and a reset input R. The set input S is used to set the cell A to its "1" state in response to a negative potential with respect to ground. The reset input R is used to reset the cell A to its "0" state also in response to a negative potential with respect to ground. When no input signal is applied to the set and reset inputs, they are essentially at ground potential regardless of whether the cell A is in its "1" state or its "0" state.

The cell B requires a reset input R similar to the reset input of cell A so that a negative potential level applied to the reset input of cell B resets that cell to its "0" state.

The cells A, B, C, D, and E are coupled together so that they step through a sequence of counter states in accordance with the sequence chart shown in FIG. 2. In FIG. 2 the left-hand column captioned "Decimal Digit" includes a list of decimal digits in sequential order. The columns under the caption "Counter State" indicate the states of each cell for stable and unstable states of the counter 20 in FIG. 1. In the counter state sequence chart of FIG. 2, each decimal digit in the left-hand column is opposite a stable counter state sequence step which agrees with the code representation of the decimal digit in the two-out-of-five code as shown in TABLE I. The counter sequence steps that are not opposite one of the decimal digits in the left-hand column of FIG. 2, represent an unstable state of counter 20 in FIG. 1.

In FIG. 1 the cells are intercoupled to step through changes of state in accordance with the following functions:

$A_T=B_{01}$; $A_S=C_{10}$; $A_R$=carry
$B_T$=clock (input) pulse; $B_R=E_{01}+D_{01}$
$C_T=B_{10}$
$D_T=A_{01}$
$E_T=D_{10}$ in which $A_T=B_{01}$ means that the cell A is toggled, or complemented, when cell B changes from its "0" state to its "1" state; $A_S=C_{10}$ means that the cell A is set to its "1" state when cell C changes from its "1" state to its "0" state; and $A_R$=carry means that the cell A is reset to its "0" state when a carry signal occurs.

A grounded pulse source 30 alternatively generates signals having ground potential or a negative potential with respect to ground. Each time an input pulse from the pulse source 30 makes a positive-going transition which is applied to the counter 20, the counter 20 steps through at least one unstable counter state into a stable counter state in accordance with the previously mentioned functions. Input pulses from the source 30 are applied over the lead 32 to the trigger input T of cell B so that the cell B changes state in response to the positive-going transition of each input pulse. In FIG. 1 the states of the counter 20 are indicated on output terminals $O_A$, $O_B$, $O_C$, $O_D$, and $O_E$ which are connected to the "1" outputs of the respective cells.

In FIG. 2 the counter states shown in rows between successive decimal digits are the unstable states through which the counter steps in accordance with the stated functions and without a further input pulse. For example, when the counter receives an input pulse while the "state 3" exists, the counter steps through three unstable states into a stable "state 4." Thus in sequential steps in accordance with the stated functions: the input pulse toggles cell B from its "1" state into its "0" state; when cell B changes from its "1" state to its "0" state, the cell C is toggled from its "1" state into its "0" state; cell A is set into its "1" state in response to cell C changing from its "1" state into its "0" state; and finally cell D is toggled when cell A changes from its "0" state to its "1" state. There are no further responsive functions after cell D is toggled because the cell B is in its "0," or reset, state and the cell E is only toggled by cell D changing from its "1" state to its "0" state in accordance with the stated functions.

When a cell change of state occurs for which there is no further responsive function, such as when the cell D changes from its "0" state to its "1" state while cell B is in its "0" state, the counter is in a stable state. The counter states in the rows with the decimal digits in FIG. 2 are all of the stable states regularly used by the counter 20.

A group of trigger and feedback paths are interposed among the cells to accomplish the previously stated functions in response to the various state changes indicated in the functions. The "1" output from cell B is coupled through a lead 33 to the trigger input of the cell A so that the cell A changes state, or is toggled, in response to the cell B changing from its "0" state to its "1" state. The "0" output of the cell B is coupled through a lead 34 to the trigger input of the cell C so that the cell C changes state in response to the cell B changing from its "1" state to its "0" state. The "1" output of cell A is coupled through a lead 36 to the trigger input of the cell D so that the cell D changes state in response to the cell A changing from its "0" state to its "1" state. The "0" output of the cell D is coupled through a lead 37 to the trigger input of the cell E so that the cell E changes state in response to the cell D changing from its "1" state to its "0" state.

Some of the feedback paths include a pulse-forming circuit for coupling an output of one cell to the set or reset input of another cell so that a predetermined change of state of the one cell rather than just its state causes the set or reset of the other cell. For instance the "1" output of the cell C is coupled through a lead 38 and a pulse-forming circuit 40 to the set input S of the cell A so that the cell A is set into its "1" state in response to cell C changing from its "1" state to its "0" state, but cell A is not continuously held in its set state by cell C remaining in its "0" state.

In the pulse-forming circuit 40, the lead 38 is coupled by way of a capacitor 42 and a diode 43 in series circuit to the set terminal of cell A. The diode 43 is poled to conduct when signals of a negative potential with respect to ground are coupled through the capacitor 42. A resistor 44 couples the junction between the capacitor 42 and the diode 43 to a ground reference potential.

In operation the junction between the capacitor 42 and the diode 43 is at ground potential until the potential on the "1" output of cell C makes a negative-going transition from ground potential to a negative potential level. This negative-going transition is coupled through the capacitor 42 to drive the junction to a substantial negative potential with respect to ground. This negative potential with respect to ground is sufficient to bias the diode 43 into conduction and set the cell A into its "1" state. When the potential on the "1" output of cell C makes a positive-going transition from the negative potential up to ground potential, the junction between the diode 43 and the resistor 44 starts at ground potential and energy stored in capacitor 42 during the positive-going transition is discharge through the resistor 44 without applying a negative potential with respect to ground to the set terminal of cell A.

There are two additional feedback paths which include pulse-forming circuits interposed between cells. The "0" output of the cell D is coupled through a lead 51 and a pulse-forming circuit, similar to the circuit 40, to the reset terminal R of the cell B. The "0" output of the cell E is coupled through a lead 52 and a pulse-forming circuit, also similar to the circuit 40, to the reset terminal R of the cell B. The feedback paths from the "0" outputs of the cells D and E to the reset terminal of the cell B are arranged so that the cell B is reset into its "0" state in response to either the cell D changing from its "0" state to its "1" state or the cell E changing from its "0" state to its "1" state.

A gate circuit 60 is arranged to produce a carry signal in response to a predetermined combination of the states of the cells A, B, C, D, and E. The gate circuit 60 normally produces a ground potential signal if at least one input signal is a negative potential with respect to ground. The gate circuit 60 produces a negative potential level carry signal in response to ground potential input signals applied concurrently to all of its inputs. The "1" ouput of cell A is coupled through a lead 61 to a first input of the gate 60. The "0" output of cell B is coupled through a lead 62 to a second input of the cell 60. The "0" output of cell C is coupled through a lead 63 to a third input of the gate 60. The "1" output of cell D is coupled through a lead 64 to a fourth input of the gate 60. The "1" output of the cell E is coupled through a lead 65 to a fifth input of the gate 60. When the counter 20 is in a 10011 state in accordance with the next-to-last row of the sequence chart in FIG. 2, the states of cells A, B, C, D, and E will activate the cell 60 into producing a negative-potential level carry signal on the lead 70 shown in FIG. 1.

Lead 70 couples the negative-potential level carry signal from the output of the gate 60 to the reset terminal R of the cell A and to an input lead 72 of the counter 21. Cell A is reset to its "0" state in response to the carry signal on the lead 70. As soon as cell A is reset to its "0" state, the gate 60 is disabled and the signal on lead 70 makes a positive-going transition to ground. This positive going transition applied to the lead 72 is used by the decimal counter 21 as an input signal which is similar to the input pulses applied to the lead 32 of the counter 20.

Assuming now that the decimal counters 20 and 21 are both resting in their respective states representing the decimal integer zero when a series of pulses are applied by the pulse source 30 to the decimal counter 20. The decimal counter 20 is positioned to represent the units integers and the decimal counter 21 is positioned to represent the tens integers of decimal numbers arranged in reverse order of standard positional notation. In response to the first input pulse, the counter 20 will step through three unstable states into a stable counter state representing the decimal integer one. Each subsequent input pulse will cause the counter 20 to increment to a stable state representing one step higher in the decimal count until the counter 20 reaches its state "9." The next subsequent input pulse causes the counter 20 to step through five unstable states until it generates the carry signal because the cells A, B, C, D, and E are respectively in their states 1 0 0 1 1.

The carry signal generated by the counter 20 is used to reset the counter 20 to its state representing the decimal integer zero by resetting the cell A. In addition the positive-going transition resulting from termination of the carry signal causes the counter 21 to increment into its state representing the tens integer one. Thus the two decimal counters have counted from zero to ten and will continue to count up to ninety-nine in response to additional input pulses applied to the lead 32. A carry signal will be generated on a lead 80 in response to the one-hundredth input pulse.

Of course additional counters similar to the decimal counter 20 may be connected in tandem to the lead 80 to increase the counting capacity of the entire counter.

The above-detailed description is illustrative of one embodiment of the invention, and it is to be understood that other embodiments thereof will be obvious to those skilled in the art. These additional embodiments are considered to be within the scope of the invention.

What is claimed is:

1. A counter comprising
A, B, C, D, and E cells positioned alphabetically, each cell having an input, an output, and first and second stable states,
a gate having a plurality of inputs and an output,
and reset means coupling the output of the gate to the input of the cell A,
the counter *characterized in that*
lead and feedback means intercouple the cell outputs to the cell inputs for stepping the cells through unstable counter states to stable counter states representing decimal numbers in a two-out-of-five code,
trigger means couple input pulses to the input of the cell B for changing the state of cell B in response to each input pulse, the cells A, B, C, D, and E stepping through at least one unstable combination of cell states into a stable combination of cell states in response to each input pulse, and
additional lead means couple the outputs of the cells to the inputs of the gate for producing a carry pulse to recycle the counter in response to a predetermined combination of cell states.

2. A counter in accordance with claim 1 in which
the means intercoupling the cell outputs to the cell inputs comprise,
means coupling the output of cell B to the input of cell A for changing the state of cell A in response to cell B changing from its second state to its first state,
means coupling the output of cell B to the input of cell C for changing the state of cell C in response to cell B changing from its first state to its second state,
means coupling the output of cell C to the input of cell A for setting cell A in its first state in response to cell C changing from its first state to its second state, means coupling the output of cell A to the input of cell D for changing the state of cell D in response to cell A changing from its second state to its first state,
means coupling the output of cell D to the input of cell E for changing the state of cell E in response to cell D changing from its first state to its second state, and
means coupling the outputs of cells D and E to the input of cell B for resetting cell B to its second state in response to cell D changing from its second state to its first state and in response to cell E changing from its second state to its first state, and
the means coupling the gate output to the input of cell A resetting cell A to its second state in response to each carry pulse.

3. A counter in accordance with claim 2 in which
the means coupling the output of cell C to the input of cell A comprises a first pulse-forming circuit,
the means coupling the output of cell D to the input of cell B comprises a second pulse-forming circuit, and
the means coupling the output of cell E to the input of cell B comprises a third pulse-forming circuit.

4. A counter in accordance with claim 3 in which each pulse-forming circuit comprises:
a unilateral conduction device,
a resistor,
means connecting the unilateral conduction device and the resistor in series circuit between a predetermined cell input and ground reference, and
capacitance means coupling a predetermined cell output to a junction between the unilateral conduction device and the resistor.

5. A counter in accordance with claim 3 in which
the gate produces each carry pulse in response to signals of one polarity applied coincidentally to all inputs of the gate.

6. A counter in accordance with claim 1 further comprising
a source produicng a series of input pulses.

7. A counter in accordance with claim 6 further comprising
means for coupling the gate output to an input of another counter.

8. A counter comprising
a bistable cell A having set, reset, and trigger inputs and having an output,
a bistable cell B having reset and trigger inputs and having an output,
input means coupling signals to the trigger input of the cell B,
means coupling the output of cell B to the trigger input of cell A,
a bistable cell C having a trigger input and having an output,
means coupling the output of cell B to the trigger input of cell C,
means coupling the output of cell C to the set input of cell A,
a bistable cell D having a trigger input and having an output,
means coupling the output of cell A to the trigger input of cell D,
a bistable cell E having a trigger input and having an output,
means coupling the output of cell D both to the trigger input of cell E and to the reset input of cell B,
means coupling the output of cell E to the reset input of cell B,
a gate having a plurality of inputs and an output,
means coupling the outputs of the cells A, B, C, D, and E separately to the inputs of the gate, and means coupling the output of the gate to the reset input of the cell A.

References Cited

UNITED STATES PATENTS

| | | | |
|---|---|---|---|
| 3,377,469 | 1/1968 | Solomon | 235—92 |
| 3,375,355 | 3/1968 | Atsushi Asada et al. | 235—156 |

MAYNARD R. WILBUR, Primary Examiner

J. M. THESZ, Assistant Examiner

U.S. Cl. X.R

340—347